United States Patent [19]
Vandenberg

[11] Patent Number: 5,694,887
[45] Date of Patent: Dec. 9, 1997

[54] CATTLE STANCHION WITH FLOATING LATCH

[76] Inventor: August Vandenberg, 1904 Trotter Trail, Norco, Calif. 91760

[21] Appl. No.: 539,838

[22] Filed: Oct. 6, 1995

[51] Int. Cl.⁶ ......................................................... A01K 15/04
[52] U.S. Cl. .................. 119/740; 119/741; 119/750
[58] Field of Search ................................. 119/738, 739, 119/740, 741, 743, 750

[56] References Cited

U.S. PATENT DOCUMENTS

| | | | |
|---|---|---|---|
| 1,158,008 | 10/1915 | Stenfield | 119/740 |
| 4,377,131 | 3/1983 | Vandenberg et al. | 119/741 |
| 5,564,368 | 10/1996 | Hepp et al. | 119/741 |

FOREIGN PATENT DOCUMENTS 2525947  12/1976  Germany ................. 119/741

*Primary Examiner*—Mark Polutta
*Attorney, Agent, or Firm*—Cislo & Thomas LLP

[57] ABSTRACT

A cattle stanchion which has posts (24) supporting a top and bottom rail (20) and (22) with spacing bars (26) in between. A number of head openings permit animal feeding through the stanchion. Each head opening includes a side bar (36) and a swing bar (46) which is supported by a pivot bar (38). The swing bar has a yoke (40) on the top aligning and retaining one end onto the top rail. A guide block (54) attached between the forked fingers (42) of the yoke slidably receives a floating locking latch (62) that interfaces with notches (72) in a drawbar positioned above the top rail. An optional lever arm (88) slides the drawbar from an open to a closed position fop each head opening and individual locking latches may be disengaged for sorting animals or if an animal is down. A rotating handle (84) permits the drawbar to be manually pivoted disengaging the locking latches from the notches providing a free feeding position for the stanchion.

17 Claims, 5 Drawing Sheets

5,694,887

CATTLE STANCHION WITH FLOATING LATCH

TECHNICAL FIELD

The present invention relates to cattle stanchions for restraining the head of an animal in general. More specifically to a self locking stanchion that includes an operating handle for opening and closing, a selector arm for free feeding and floating latches for individual cattle release.

BACKGROUND ART

Previously, many types of cattle stanchions have been used in endeavoring to provide an effective means for producing a method restraining cattle for feeding or milking. Cattle stanchions that hold the head of a cow, bull, steer or oxen by parallel bars narrower than the animals head have been well known in the art and used for centuries.

During modern times however, stanchions have become mechanized permitting numerous animals to be restrained and released individually and in unison by a single operator at a specific location.

The advantage of restraining one or more head of cattle during feeding permits their consumption to be monitored thus, ensuring an appropriate amount of food. This ability to restrain animals also facilitates veterinary examination and separation of particular animals from the herd. In dairy's, stanchions are often employed to hold cows during the milking process.

Prior art has developed stanchions that restrain and release a number of animals from a single operating station and has even used automatic locking allowing the animal to enter the stanchion and trip one of the upright bars into a locked position without human intervention.

Some prior art has even utilized automatic securement systems that uniformally adjust the stanchion between a locked and unlocked condition according to a predetermined schedule using timing equipment and electrical or pneumatic power.

A search of the prior art did not disclose any patents that read directly on the claims of the instant invention, however the following U.S. patents are considered related:

| U.S. Pat. No. | INVENTOR | ISSUED | |
|---|---|---|---|
| 5,373,813 | DaSilveira | 20 December | 1994 |
| 5,309,869 | Albers Jr. | 19 May | 1994 |
| 5,289,798 | Lock | 1 March | 1994 |
| 5,226,387 | Anderson | 13 July | 1993 |
| 4,995,335 | Wright | 26 February | 1991 |
| 4,976,224 | Hatfield | 11 December | 1990 |
| 4,951,608 | Reisgies, et al | 28 August | 1990 |
| 4,940,022 | Spinder | 10 July | 1990 |
| 4,930,452 | DaSilveira | 5 June | 1990 |
| 4,867,105 | Hatfield | 19 September | 1989 |
| 4,864,968 | Bell, et al | 12 September | 1989 |
| 4,534,318 | Vande Veld | 13 August | 1985 |
| 4,513,693 | Vandekeybus | 30 April | 1985 |
| 4,512,287 | Vandekeybus | 23 April | 1985 |
| 4,495,897 | Albers Sr. | 29 January | 1985 |
| 4,476,815 | Albers Sr. | 16 October | 1984 |
| 4,457,265 | Anderson | 3 July | 1984 |
| 4,314,528 | Fogleman | 9 February | 1982 |
| 4,241,699 | Orchard | 30 December | 1980 |
| 4,185,592 | Albers Sr. | 29 January | 1980 |
| 4,055,149 | Haiges | 25 October | 1977 |
| 4,051,813 | Albers | 4 October | 1977 |
| 4,037,566 | Albers | 26 July | 1977 |
| 3,863,604 | Nielsen et al | 4 February | 1975 |

-continued

| U.S. Pat. No. | INVENTOR | ISSUED | |
|---|---|---|---|
| 3,734,059 | Rodriguez | 22 May | 1973 |
| 3,568,644 | Schultez | 9 March | 1971 |
| 3,511,216 | George | 12 May | 1970 |
| 3,095,858 | Bauer | 2 July | 1963 |

DaSilveira in U.S. Pat. No. 5,373,813 teaches an automated cattle stanchion securement system that may be manually deployed or disengaged for selectively restraining or releasing one or more animals. The stanchion 10, with frame 12 and a plurality of stanchion openings 14, has side frame members 18,19 horizontal upper member 20 and horizontal lower frame member 22 with vertical supports 23 at one or both ends of the assembly. Restraining bars 24 pivotally mounted to one side of each stanchion opening may be in a diagonal position across stanchion opening 14a, or in a second substantially vertical position, as in stanchion opening 14b. In the first position, an animal may insert its head into the area above restraining bar 24. When the animal lowers its head, the restraining bar is pivoted to the vertical position, resulting in a frame opening that is narrower than the animal's head. Locking the restraining bar in this position will restrain the animal. If unlocked, the restraining bar may be pivoted by the animal to the diagonally extending position and the animal may remove his head. Retaining rings 28 mounted on the end of bars 24 are engaged by securing mechanism 32, having a latching rail 34 and latch device 36. When the latch device is deployed, the ends 39 are lowered to provide the means to secure the retaining ring 24. When the animal places his head into the stanchion and lowers it, thereby rotating bar 24 vertically, the retaining ring 24 will slip over the latch device to be engaged by the ends 39. The ends 39 can be individually lifted to release the bar, or automatically the lock bar can be rotated 90 degrees to disengage all latch mechanisms.

U.S. Pat. No. 5,309,869 issued to Albers Jr. is directed to a cattle stanchion apparatus capable of actuation to quickly released downed cattle, even in extreme temperature conditions without providing for longitudinal adjustment of the latch couplers while providing quieter operation, less wear and longer service life. Each head opening 20 has a fixed stanchion 18 and a pivoted release stanchion 22 with the release stanchion having three positions—closed shown in FIG. 1 with a long, narrow opening to hold the cow, open shown in FIG. 2 being wide at top and downed cow position shown in FIG. 3 being wide at the bottom. A latching means carried by the upper end of the release stanchion comprises a bracket 32 with pins 38,40 supporting fingers 42,44. The fingers can slide along rotatable positioning rod 46. Mirror image notches 52,54 formed in the rod can be engaged by the fingers for locking the stanchion in place. The fingers can be manually lifted to release a single stanchion, or the positioning rod 46 can be rotated to disengage all fingers, releasing all stanchions.

Lock's U.S. Pat. No. 5,289,798 discloses a livestock handling apparatus mounted on wheels having a plurality of stanchions, each having three positions, open, locked and a third position for removing downed animals. The apparatus 1, with stanchions 146 having a fixed side 149 and pivoted side 151, has a latching mechanism 167 with latches 171, 172. The upper end 163 of the pivoted side bar is capable of passing between the latch pivots 167,170 and becoming locked in place by the latches. A deactivator means 179 including rod 181 with nubs 182,183 that, upon rotating rod 181, engage the latches and release the stanchion end 163.

Hatfield in U.S. Pat. No. 4,976,224 teaches a double hinged cattle stanchion with a trigger mechanism to provide a means for the operator to safely release a downed animal without physically having to touch the latch. Each fulcrum stanchion 12 has a head 28 attached to its upper end with a stop dog 26 that encases coupler 23 on actuator rod 21. The stop dog has a trigger 31 for safe manual release of the stop dog from the couple 23 without endangering the operator's hand or fingers.

The prior art reference of Fogleman in U.S. Pat. No. 4,314,528 is directed to a cattle stanchion having a simplified self-locking mechanism. The self-locking cattle stanchion S has gravity operated locking bales 50 that drop such that tab 52 extends into the track 30 in a blocking position for engaging the upper end of the swing bar Z0. The bales can be disengaged by moving control bar 40 to its second position, whereby plates 60 support tab 52 of the bales, freeing the swing bar 20.

For background purposes and as indicative of the art to which the invention is related, reference may be made to the remaining cited patents.

DISCLOSURE OF THE INVENTION

It is plainly seen that prior art has developed the concept of retaining cattle for feeding in a comprehensible manner including entry, automatic release etc. However, the need still exists to improve upon and include all of the concepts in a single device. It is therefore, a primary object of the invention to provide a cattle stanchion that opens and closes each head opening by the simple movement of a lever while also providing the ability for each animal to also lock the stanchion. The locking is accomplished by placing their head between a side bar and a swing bar pivoting the swinging bar into a locking position. Further, a control mode provides free feeding of the animals disengaging all of the swing bars by a simple manipulation of a rotating handle independent of the opening and closing bar. The invention spring loads the mechanism used for free feeding thereby eliminating the previous problem of the animal accidentally tripping on the controls when in the locked position. Finally, release of an individual animal is possible by lifting a floating lever latch which is independent of other functional regulation.

An important object of the invention provides automatic protection if an animal goes down when the stanchion is in the free feeding mode. The swing bar rotates by itself therefore, if an animal falls or in some way lays down, the stanchion does not choke the animal instead there is sufficient space for self removal from the structure, Another object of the invention is directed to its quiet operation as the guide block for retaining the floating locking latch is fabricated of nylon thus dampening the noise created by the looking latch when the drawbar is slid horizontally. Further, the locking latch is always in contact with the drawbar through gravity. When the latch is positioned within the notch in the drawbar it is in a free position.

Still another object of the invention permits finger tip control to release a single animal. The apparatus uses a flat plate floating locking latch within a nylon guide block requiring only slight tension to lift the latch from engagement. This object is particularly useful if an animal is down and chocking between the bars in the stanchion making speed and ease of operation a prime consideration.

Yet another object of the invention has to do with the simplicity of operation. Along with its speed, it is intuitively obvious for the untrained to understand its function sufficiently to release a downed animal. Further, the drawbar sliding lever and rotating handle are simple and easy to understand, as their function is obvious.

A final object of the invention is the ease in which a heifer or cow may be trained to use the stanchion. Even if the animal has not used this stanchion previously, the feed on the opposite side attracts the animal and the only opening large enough for the head is adjacent to the swing bar. Therefore before long the animal is willing to use the invention and operate the self locking feature.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
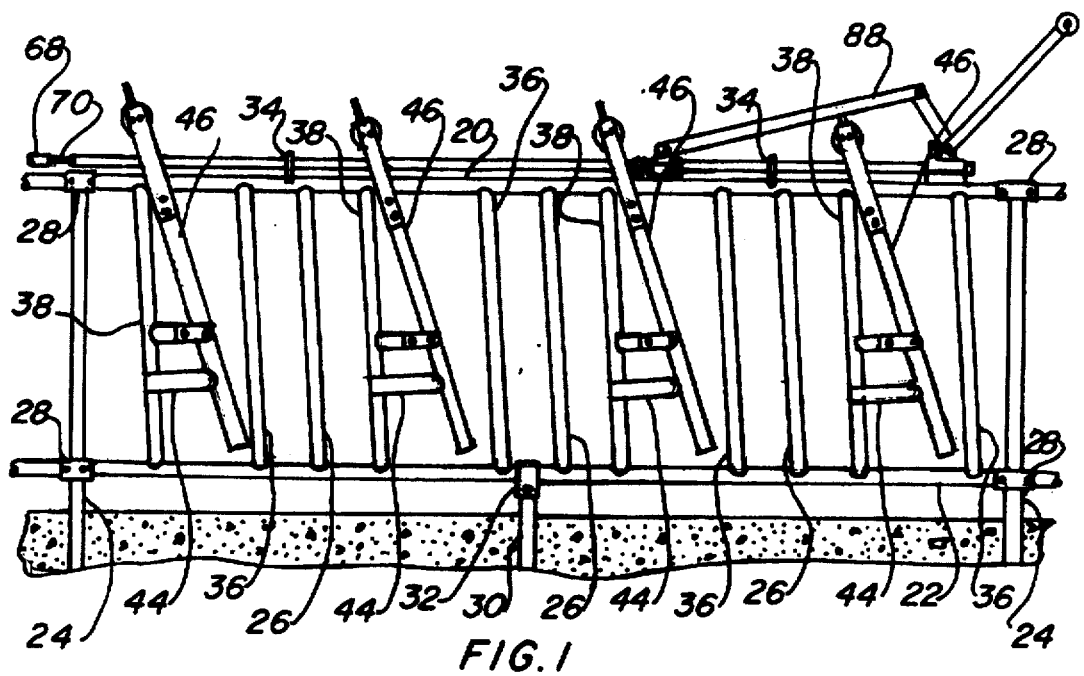
FIG. 1 is an elevational view of the preferred embodiment with the drawbar in the open position.

The best mode for carrying out the invention is presented in terms of a preferred embodiment that is shown in FIGS. 1 through 14 and that is comprised of: a cattle stanchion that includes a horizontal top rail 20, a bottom rail 22 parallel with the top rail, and a number of vertical stanchion posts 24 spaced and attached between the top and bottom rails. A number of spacing bars 26 are located between the top and bottom rails 20 and 22 and act to space the bars apart and create a barrier for cattle. The top and bottom rails are attached to the posts 24 by the use of post formed clamps 28.

Figure 2:
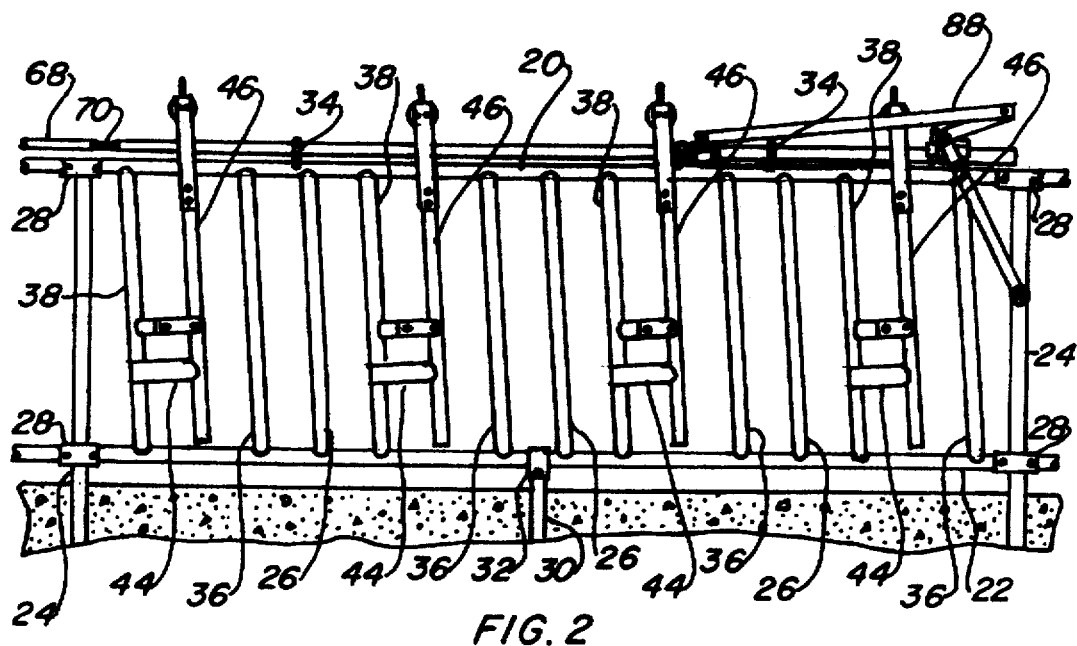
FIG. 2 is an elevational view of the preferred embodiment with the drawbar in the closed position.

A plurality of pegs 30 and peg clamps 32 located between the posts 24 further support the bottom rail 22 as shown in FIGS. 1 and 2.

A number of drawbar guide brackets 34 are attached to the upper surface of the top rail 20 as also illustrated in FIGS. 1 and 2. These guide brackets 34 are preferably flat and have a hole therein, to receive a drawbar and are attached by welding or the like. The bracket 34 in lieu of being flat may even be a cut section of hollow pipe, a washer or the like. A stanchion side bar 36 is attached between the top 20 and bottom rail 22 parallel with one of the spacing bars 26. It should be noted that the bars 26 and 36 while parallel, may be either at right angles to the rails 20 and 22 or positioned angularly with two or three degrees preferred as illustrated.

A pivot bar 38 is joined between the top 20 and bottom rail 22 also coplanar with the spacing bar 26 and side bar 36. The pivot bar 38 further contains a yoke arm 40 that extends at a right angle therefrom forming a bifurcated end consisting of a pair of parallel fingers 42, one attached to each side of the arm 40. A forked guide 44 is positioned directly below the yoke arm 40 and consists of a pair of parallel outwardly projecting hands.

A swing bar 46 is pivotally attached between the fingers 42 of the yoke arm 40 and is free to swivel horizontally within the limits of the structure. It should be noted at this point that while a single side bar 36, pivot bar 38 and swing bar 48 have been described, they unitedly form one parallel stanchion head opening for a single animal. Any number of head openings may be used in concert in the invention. As illustrated in FIGS. 1 and 2, four separate head openings are used and this may be expanded as required by the application.

Figure 9:
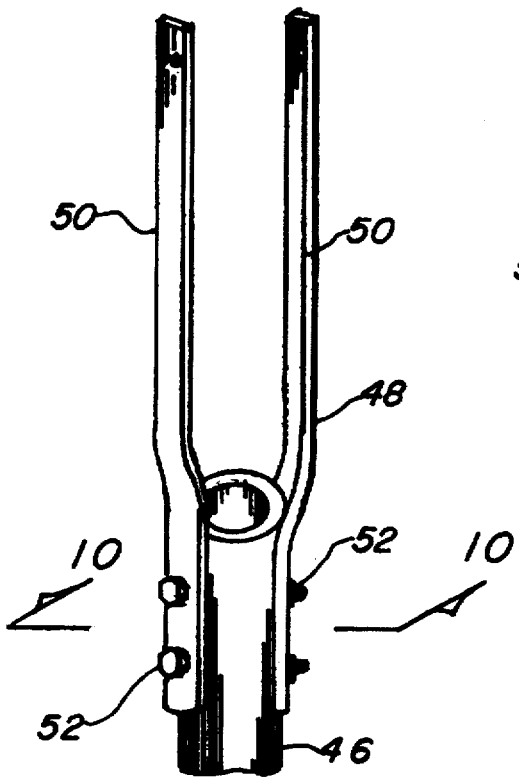
FIG. 9 is a fragmentary partial isometric view of the swing bar yoke completely removed from the invention for clarity.
Figure 10:
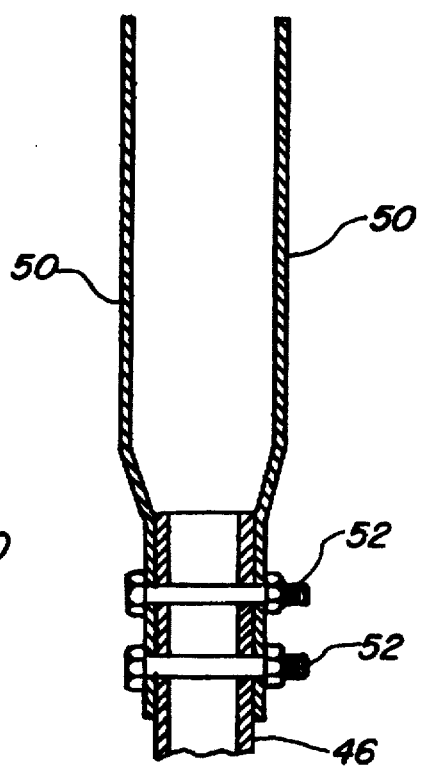
FIG. 10 is a cross sectional view taken along lines 10—10 of FIG. 9.

The swing bar 46 thus described, further includes an attached swing bar yoke 48 that is formed of a pair of ears 50 radially conforming to the outside shape of the swing bar 46 on one end and straight and flat on the other. The conforming end includes holes and a pair of threaded fasteners 52 are disposed therethrough attaching the yoke 48 to the swing bar 46 as illustrated in FIGS. 9 and 10.

Figure 3:
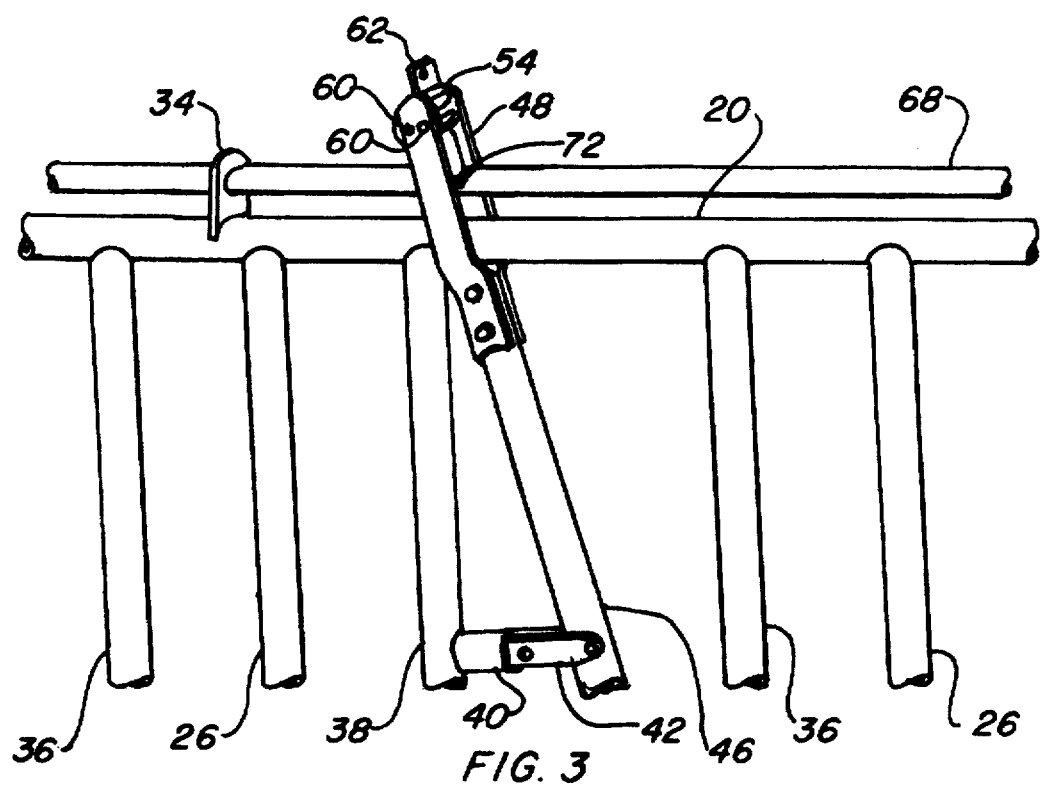
FIG. 3 is a partial isometric view of the floating latch in the open or released position.
Figure 4:
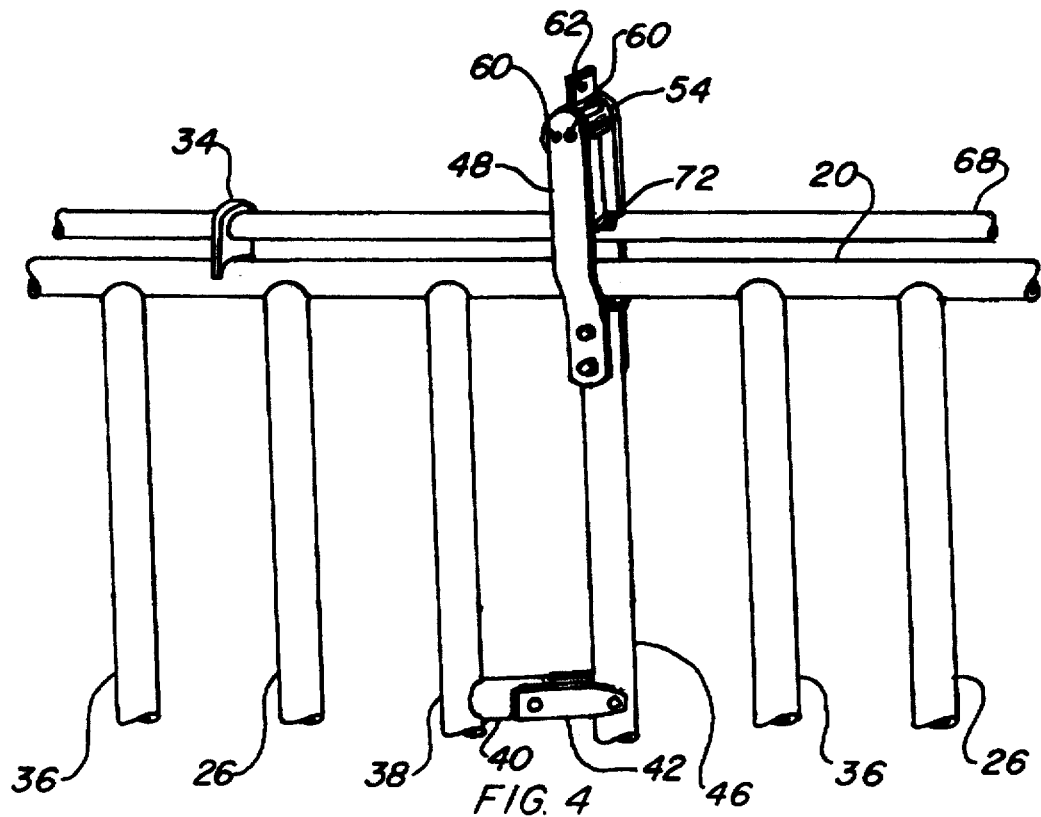
FIG. 4 is a partial isometric view of the floating locking latch in the closed or locked position.

The swing bar yoke 48 is slid under the top rail 20 such that it retains the top portion of the swing bar 46 between the ears 50. A guide block 54, shown by itself in FIGS. 7 and 8 and assembled in FIGS. 3 and 4 is attached with fastening means into the swing bar yoke 48 enclosing the yoke over the top rail 20. The guide block 54 has a slot 56 completely through and a pair of parallel bores 58 adjacently located one on each side of the slot 56. The block 54 further has a length equal to the opening in the swing bar yoke 48 and the fastening means comprise a pair of bolts with nuts 60 that penetrate through both the ears 50 and block 54, best depicted in FIGS. 3 and 4. The guide block 54 may be made of any material suitable for the purpose with thermoplastic or thermoset material favored with nylon being preferred.

Figure 5:
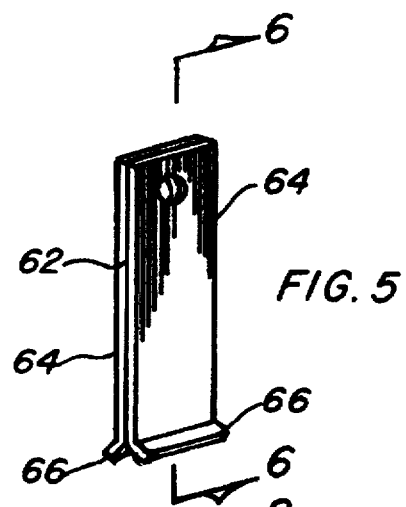
FIG. 5 is a partial isometric view of the floating latch completely removed from the invention for clarity.
Figure 6:
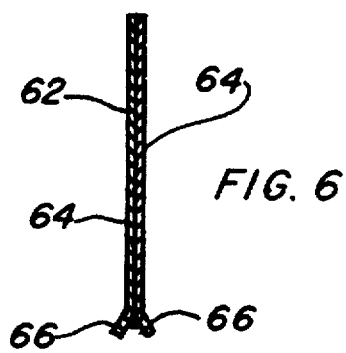
FIG. 6 is a cross sectional view taken along lines 6—6 of FIG. 5.
Figure 7:
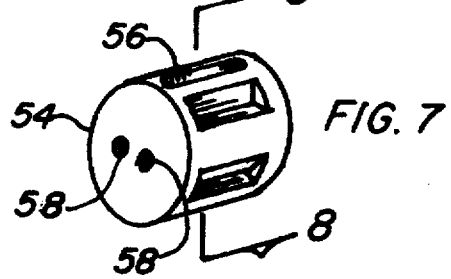
FIG. 7 is a partial isometric view of the guide block completely removed from the invention for clarity.
Figure 8:
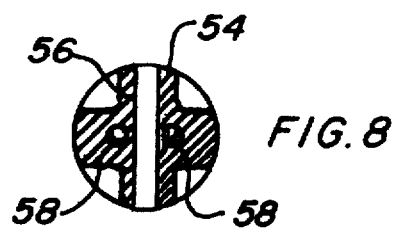
FIG. 8 is a cross sectional view taken along lines 8—8 of FIG. 7.

A floating locking latch 62 is slidably retained within the guide block slot 56 as shown in FIGS. 1-4 and illustrated by itself in FIGS. 5 and 6. This latch 62 is preferably formed of a pair of opposed sides 64 welded together with each having a outwardly facing angular flange 66. The latch 62 is positioned inside the slot 56 in the guide block 54 and held captive as the flanges 66 are wider than the slot 56.

It should be noted that the above described rails posts and bars may be fabricated of any structural material such as fiberglass, wood, or metal in a round, or square configuration either solid or hollow. It has been found however, that a circular 1½ (3.8 cm) diameter standard wall (schedule 40) pipe is ideal for the application permitting welding to connect the ends together forming a stanchion having more than adequate structural integrity.

A drawbar 68 is slidably held within the guide brackets 34 that are attached to the top rail 20. The drawbar 68 extends the full length of the stanchion regardless of the number of posts 24 and head openings. The preferred material is round metal pipe such as ¾ inch (1.9 cm) standard wall (schedule 40) black iron or galvanized pipe. Sections of this pipe material may be joined together to form a continuous length using welded joints with a round splice piece 70 inserted into each open end of the pipe and spaced apart as required such as illustrated in FIGS. 1 and 2.

The drawbar 68 contains a series of notches 72 adjacent to each locking latch 62 providing a shoulder for engaging flanges 66 of the latch 62. Each notch is just slightly longer than the combined flanges 66 of the locking latch 62 and has a depth of approximately 40 to 50 percent of the drawbar diameter which equates to ⅜ inch (0.95 cm) in the preferred pipe size.

When the drawbar 68 is slid linearly within the guide brackets 34 each attached swing bar 46 pivots from an open to a closed position as shown in FIGS. 1 and 2 respectfully. This movement locks the animals head between the swing bar 46 and the side bar 36 in each head opening.

Figure 11:
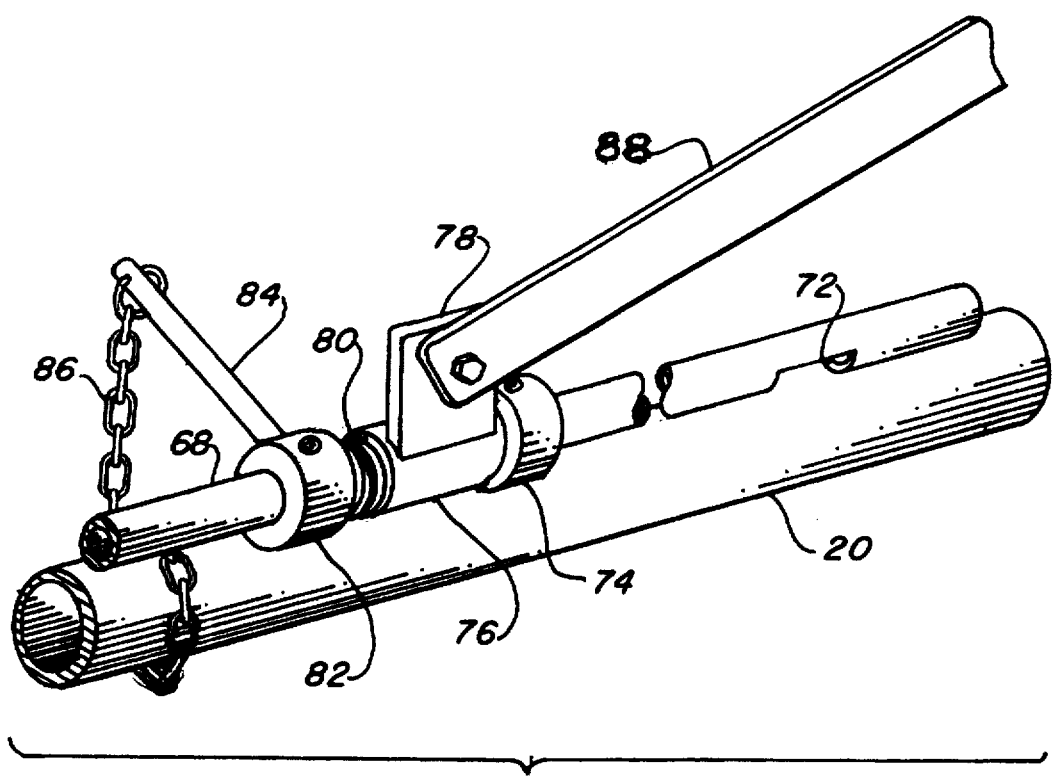
FIG. 11 is a fragmentary partial isometric view of the drawbar rotating and spring means in the open free feeding position.
Figure 12:
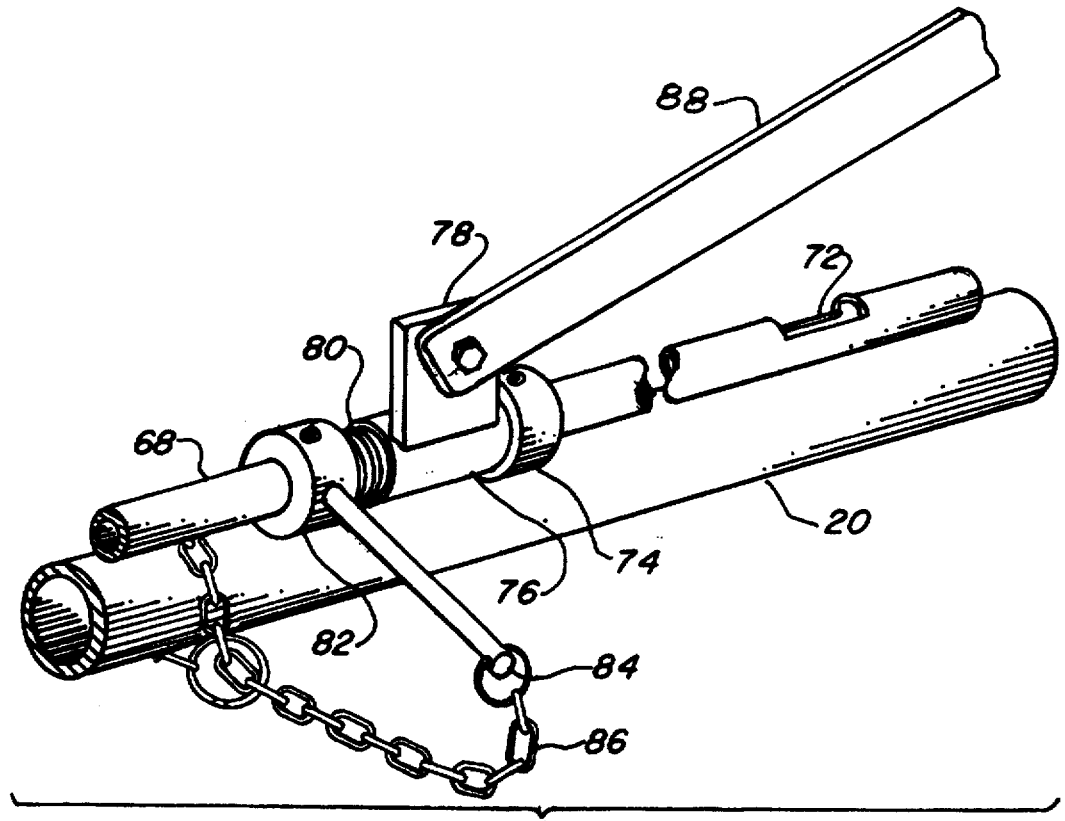
FIG. 12 is a fragmentary partial isometric view of the drawbar rotating and spring means in the closed or locking position.

The drawbar 68 is held in tension against each locking latch 62 at the notch 72 interface by spring means that places the drawbar in tension. Thus, preventing unintentional rotation of the drawbar 68 by the cattle locked in the stanchion which would result in unlocking all of the head openings simultaneously. The spring means as shown in FIGS. 11 and 12 consists of a stop collar 74 slipped over the drawbar 68 and locked in place, with a drawbar connector 76 positioned touching the stop collar 74. This connector 76 has an upstanding mounting bracket 78, for attachment, and a compression spring 80 is located over the drawbar touching the connector 78 on the side opposite the stop collar 74. A tensioning collar 82 is also placed over the drawbar 68 and is urged toward the connector 76. This action forces the spring 80 to partially retract maintaining a constant force on the locking latch 62 and notch 72 junction when the mounting bracket is mechanically linked to the top rail 20.

The drawbar 68 is revolvably repositioned to create a free feeding arrangement permitting each swing bar 46 to pivot freely for unregulated feeding of the cattle. The notches 72 in the drawbar 68 are rotated away from the locking latches 62 as shown in FIG. 11. This arrangement utilizes a rotating handle 84 integral with the drawbar connector 76 which permits manual rotation of the entire drawbar 68. A chain 86 is attached between the handle 84 and the drawbar to prevent the loss of the handle 84 when not being used to rotate the drawbar 68. FIG. 12 illustrates the drawbar notches 72 up in the locking position and the handle 84 horizontal on the front. FIG. 11 shows the notches 72 down in the free feeding position with the handle 84 rotated on the rear.

If it is desired to lock and unlock each head opening simultaneously from a single station, a drawbar sliding lever arm 88 is optionally attached to the drawbar 68 and top rail 20. Thus, allowing the sliding of the drawbar and related swing bars 46 from an open to a closed position through the engagement of the locking latches 62 into the drawbar notches 72. This sliding lever arm 88 consists of an operating handle 90 having a grip 92 on an extended end and is permanently attached to a stub shaft 94 on the other. The stub shaft 94 further has a swing shaft arm 96 that is spaced apart at an acute angle and yet is planar with the handle 90. A pillow block 98 is connected to the top rail 20 and rotatably receives the stub shaft 94 allowing it to pivot providing an attaching support for the lever arm 88.

Figure 13:
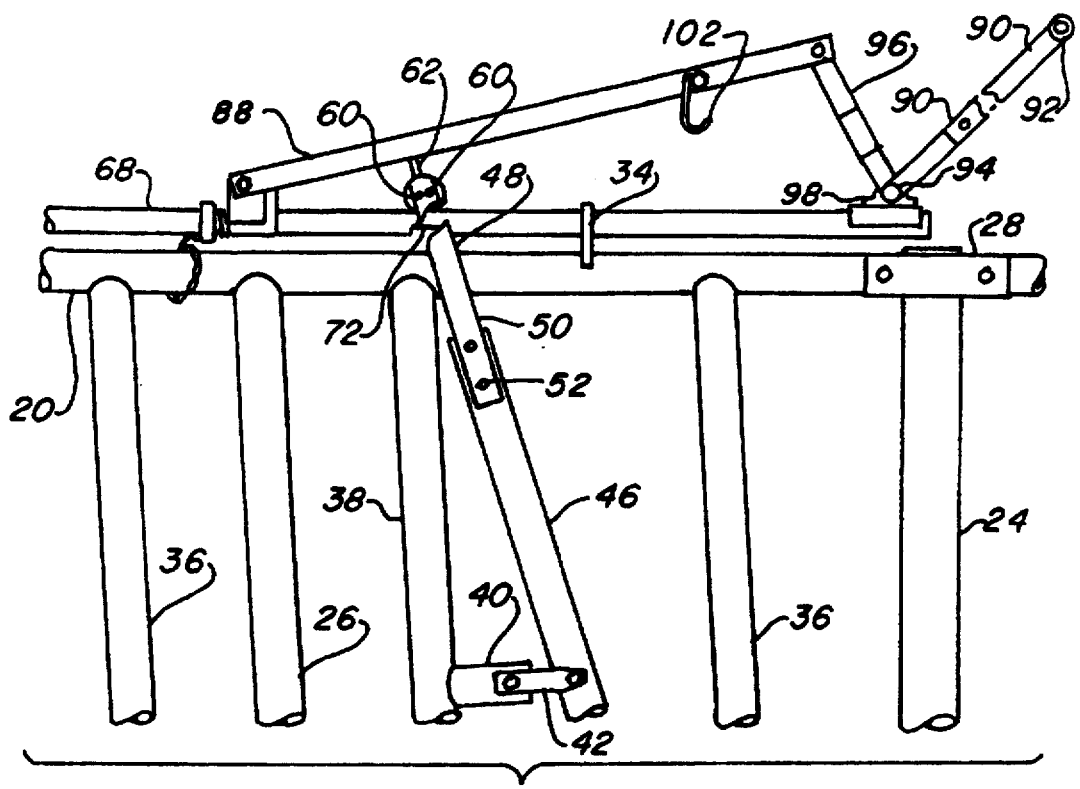
FIG. 13 is a fragmentary elevational view of the drawbar sliding lever arm in the open and free position unlocking all stanchions.
Figure 14:
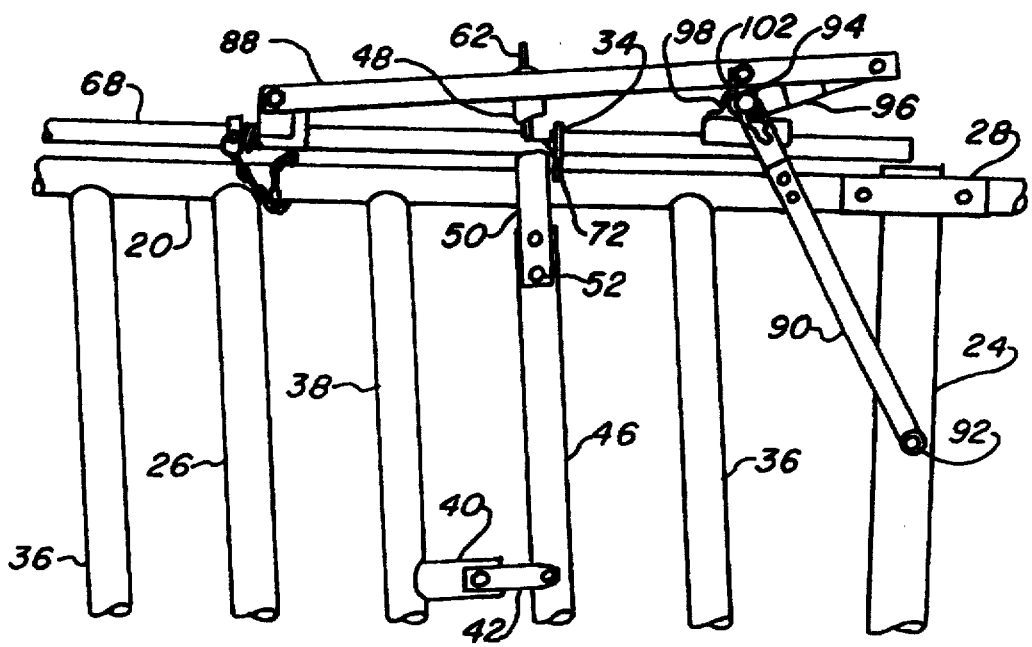
FIG. 14 is a fragmentary elevational view of the drawbar sliding lever arm in the closed position locking all stanchions closed and with the spring means also rotated closed.

A connecting link 100 pivotally joins the rotatable shaft arm 96 on one end and is bolted loosely to the drawbar spring loading connector 76 on the other as shown in FIGS. 13 and 14. A "J" shaped, pivotally mounted locking latch 102 is loosely bolted to the connecting link 100 directly above the pillow block 98 and stub shaft 94. The locking latch 102 is swingable into and out of a locking position between the operating handle 90 and shaft arm 96 around the stub shaft 94, as shown broken away in FIG. 14. The latch 102 locks the entire handle 90 and attached drawbar 68 preventing a sliding movement of the drawbar 68 causing accidental opening by the motion of an enclosed animal. When the unlocked operating handle 90 is manually rotated, movement is transferred linearly between the handle 90 and the shaft arm 96 through the connecting link 100 sliding the drawbar 68 linearly through the guide brackets 34 simultaneously opening and closing the swing bar 46 in each head opening.

While simultaneous locking and unlocking of each head opening is an asset in some applications, it is not always necessary. Therefore, the above described sliding lever arm 88 and its accompanying operating handle 90, grip 92, shaft arm 96, pillow block 98, and locking latch 102 may be eliminated. In this case, the remainder of the functional operation is unchanged only the option of simultaneous locking and unlocking is eliminated.

It will be noted that in operation, there are four separate functions. First when optionally preferred, the individual head openings may be opened and closed manually as described above. Second, individual animals may be individually released by manually lifting the locking latch 62 upward for sorting and when an animal is down. Third, a free feeding position function is controlled by the rotating handle 84 releasing all of the head openings simultaneously from the operating station by manually rotating the handle 84. Finally when in the free feeding position, each animal automatically locks the swing bar 46 if the drawbar has been subsequently rotated into its locked position, by pivoting the swing bar 46 into connection when the animal's head is lowered for feed.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

I claim:

1. A cattle stanchion with a floating latch of the type having a horizontal top rail, a bottom rail planar with the top rail, a plurality of spaced apart vertical stanchion posts contiguous with the top and bottom rail, for support thereof and a plurality of spacing bars attached between the fop and bottom rails interadjacent to the posts wherein the improvement comprises:

a) a plurality of spaced apart drawbar guide brackets having a hole therein joined on an upper surface of the top rail,
    b) at least one stanchion side bar joined between the top and bottom rails, coplanar with one of the spacing bars,
    c) at least one pivot bar joined between the top and bottom rails coplanar with a stanchion side bar,
    d) at least one swing bar swivelly attached to said pivot bar wherein a side bar and a swing bar unitedly define one parallel stanchion head opening,
    e) a swing bar yoke attached to each swing bar disposed slidable over the top rail such that it retains the swing bar in adjacent alignment therewith,
    f) a guide block having a slot therethrough joined with fastening means, into each swing bar yoke enclosing the yoke over the top rail,
    g) a floating locking latch slidable retained within each guide block slot,
    h) a drawbar slidable disposed within the guide brackets with the drawbar having a notch adjacent to each locking latch with each locking latch contiguously engaging each notch such that when the drawbar is urged linearly within the brackets each attached swing bar pivots from an open to a closed position for locking an animal's head between the swing bar and the side bar in each head opening also each locking latch individually slidable within each guide block such that an associated swing bar may be manually released by manually lifting the appropriate locking latch from direct contact with the interrelated notch in the drawbar if an animal is down,
    i) drawbar spring means integral with the drawbar for urging each slot against each locking latch preventing unintentional rotation of the drawbar by cattle locked in the stanchion,
    j) drawbar rotating means integral with the drawbar for rotating the notches in the drawbar from a position contiguous with each locking latch to an opposite connected position freeing each swing bar within the stanchion for unregulated feeding of cattle, and
    k) a drawbar sliding lever arm jointly attached to the drawbar and top rail for sliding the drawbar and related swing bars from an open to a closed position through engagement of the locking latches into the drawbar notches.

2. The cattle stanchion as recited in claim 1 further comprising formed clamps fastened between the stanchion posts, top rail and bottom rail for attachment therebetween.

3. The cattle stanchion as recited in claim 1 wherein said pivot bar further comprises:

a) a pivot bar yoke arm extending at a right angle from said pivot bar,
    b) a pivot bar yoke attached to said yoke arm extending the arm and forming a bifurcated end for pivotally receiving a swing bar, and
    c) a forked guide disposed below said yoke arm for guiding and reinforcing said swing bar when in a closed position.

4. The cattle stanchion as recited in claim 1 wherein said swing bar yoke further comprises a pair of ears radially conforming to the swing bar on one end and straight and flat on the other having holes on each end for attachment and a plurality of threaded fasteners disposed through the conforming end holes for attachment to the swing bar.

5. The cattle stanchion as recited in claim 4 wherein said guide block further comprises a cylindrical block having a pair of parallel bores one on each side of the slot, the block further having a length equal to the swing bar yoke opening width.

6. The cattle stanchion as recited in claim 5 wherein said guide block fastening means further comprises a pair of bolts with nuts disposed through the holes in the yoke ears and guide block bores.

7. The cattle stanchion as recited in claim 1 wherein said guide block is made of nylon.

8. The cattle stanchion as recited in claim 1 wherein said floating locking latch further comprises a pair of opposed sides welded together each side having an outwardly facing angular flange each latch interfacing with one of the notches in the drawbar and to retain the latch between the guide block and drawbar.

9. The cattle stanchion as recited in claim 1 wherein said drawbar is round.

10. The cattle stanchion as recited in claim 9 wherein said drawbar notch further has a depth of from 40 to 50 percent of drawbar diameter.

11. The cattle stanchion as recited in claim 9 wherein said drawbar spring means further comprises:
   a) a stop collar on the drawbar,
   b) a drawbar connector on the drawbar attached to the sliding lever arm contiguous with the stop collar,
   c) a tensioning collar on the drawbar adjacent to the connector opposite the stop collar, and
   d) a compression spring disposed on the drawbar between the tensioning collar and the connector urging the drawbar into tension when the floating lever latch engages with a notch in the drawbar.

12. The cattle stanchion as recited in claim 11 wherein said drawbar rotating means further comprises a rotating handle integral with the drawbar connector.

13. The cattle stanchion as recited in claim 12 further comprising a chain attached between the rotating handle and the drawbar to limit the handles rotation.

14. The cattle stanchion as recited in claim 11 wherein said drawbar sliding lever arm further comprises:
   a) an operating handle having a first end and a second end, the handle defining a lever,
   b) a handle grip attached to the second end of the operating handle for gripping by hand,
   c) a stub shaft attached at a right angle to the first end of the operating handle,
   d) a shaft arm connected to the stub shaft at an acute angle to the operating handle,
   e) a pillow block connected to the top rail receiving the stub shaft in a pivotal manner for support thereof,
   f) a locking latch pivotally attached to the lever arm in such a manner that it partially surrounds the stub shaft locking the lever arm in place until manually pivoted therefrom into an unlocked position, and
   g) a connecting link adjoined between the rotatable shaft arm and the drawbar spring loading connector such that when the operating handle is manually rotated, movement is transferred linearly between the handle and the shaft arm through the connecting link sliding the drawbar linearly through the guide brackets therefore simultaneously opening and closing a swing bar in each head opening.

15. The cattle stanchion as recited in claim 1 further comprising a plurality of peg clamps disposed between the stanchion posts for supporting the bottom rail.

16. A cattle stanchion with a floating latch of the type having a horizontal top rail, a bottom rail planar with the top rail, a plurality of spaced apart vertical stanchion posts contiguous with the top and bottom rail, for support thereof and a plurality of spacing bars attached between the top and bottom rails interadjacent to the posts wherein the improvement comprises:
   a) a plurality of spaced apart drawbar guide brackets having a hole therein joined on an upper surface of the top rail,
   b) at least one stanchion side bar joined between the top and bottom rails, coplanar with one of the spacing bars,
   c) at least one pivot bar joined between the top and bottom rails coplanar with a stanchion side bar,
   d) at least one swing bar swivelly attached to said pivot bar wherein a side bar and a swing bar unitedly define one parallel stanchion head opening,
   e) a swing bar yoke attached to each swing bar disposed slidably over the top rail such that it retains the swing bar in adjacent alignment therewith,
   f) a guide block having a slot therethrough joined with fastening means, into each swing bar yoke enclosing the yoke over the top rail,
   g) a floating locking latch slidably retained within each guide block slot,
   h) a drawbar slidably disposed within the guide brackets with the drawbar having a notch adjacent to each locking latch with each locking latch contiguously engaging each notch such that when the drawbar is urged linearly within the brackets each attached swing bar pivots from an open to a closed position for locking an animal's head between the swing bar and the side bar in each head opening also each locking latch individually slidable within each guide block such that an associated swing bar may be manually released by manually lifting the appropriate locking latch from direct contact with the interrelated notch in the drawbar if an animal is down,
   i) drawbar spring means integral with the drawbar for urging each slot against each locking latch preventing unintentional rotation of the drawbar by cattle locked in the stanchion, and
   j) drawbar rotating means integral with the drawbar for rotating the notches in the drawbar from a position contiguous with each locking latch to an opposite connected position freeing each swing bar within the stanchion for unregulated feeding of cattle.

17. A cattle stanchion with a floating latch of the type having a horizontal top rail, a bottom rail planar with the top rail, a plurality of spaced apart vertical stanchion posts contiguous with the top and bottom rail, for support thereof and a plurality of spacing bars attached between the top and bottom rails interadjacent to the posts, a plurality of stanchion side bars and pivot bars having swing bars attached between the top and bottom rails, wherein the improvement comprises:
   a) a swing bar yoke attached to each swing bar disposed slidably over the top rail such that it retains the swing bar in adjacent alignment therewith,
   b) a guide block having a slot therethrough joined with fastening means, into each swing bar yoke enclosing the yoke over the top rail,
   c) a floating locking latch slidably retained within each guide block slot,
   d) a drawbar slidably disposed within the guide brackets with the drawbar having a notch adjacent to each locking latch with each locking latch contiguously engaging each notch such that when the drawbar is urged linearly within the brackets each attached swing bar pivots from an open to a closed position for locking an animal's head between each swing bar and side bar also each locking latch individually slidable within each guide block such that an associated swing bar may be manually released by lifting the appropriate locking latch from direct contact with the interrelated notch in the drawbar if an animal is down,
   e) drawbar spring means integral with the drawbar for urging each slot against each locking latch preventing unintentional rotation of the drawbar by cattle locked in the stanchion, and
   f) drawbar rotating means integral with the drawbar for rotating the notches in the drawbar from a position contiguous with each locking latch to an opposite connected position freeing each swing bar within the stanchion for unregulated feeding of cattle.

* * * * *